United States Patent Office 3,267,756
Patented August 23, 1966

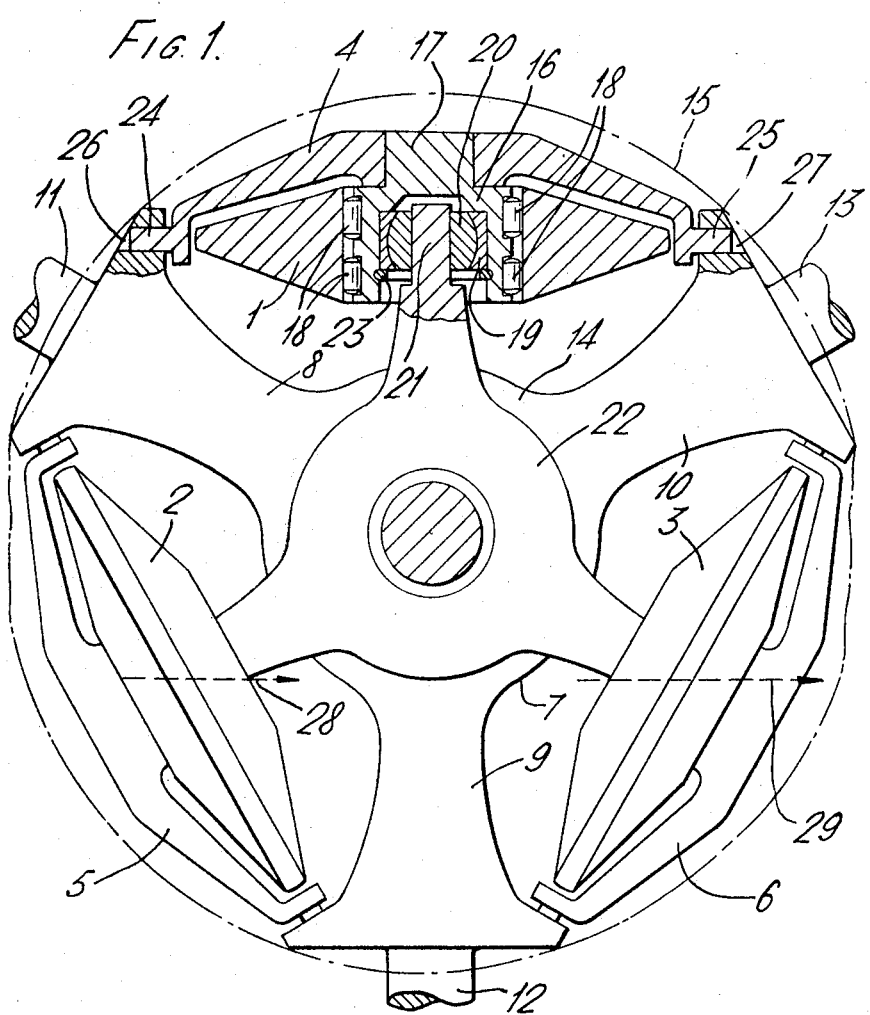

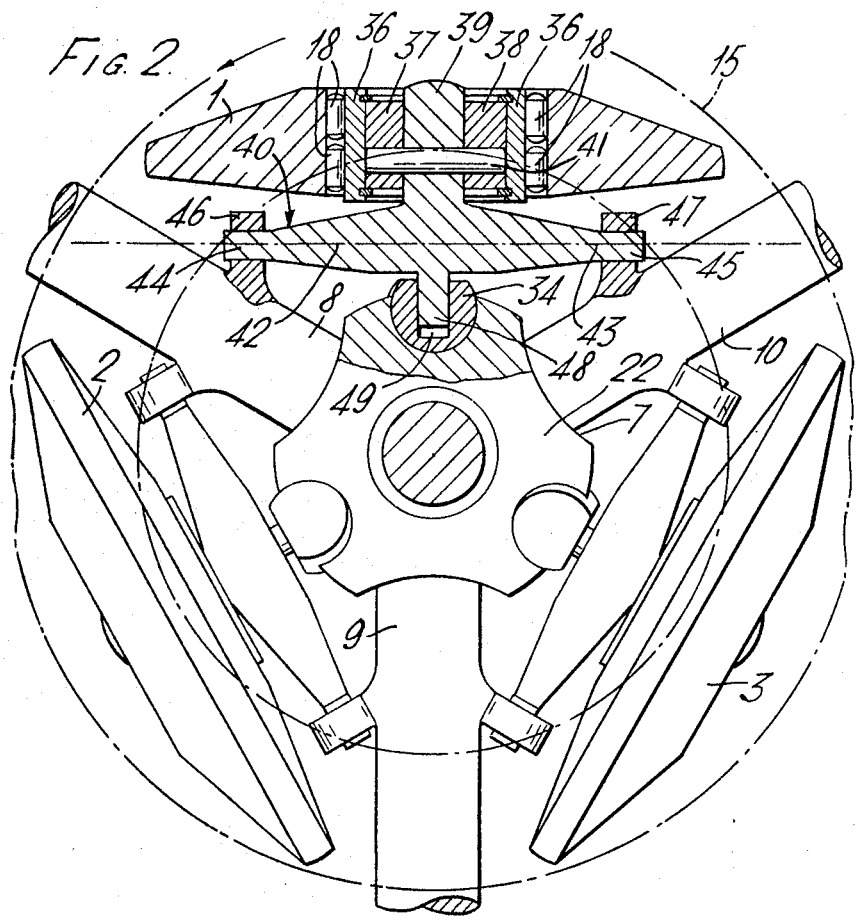

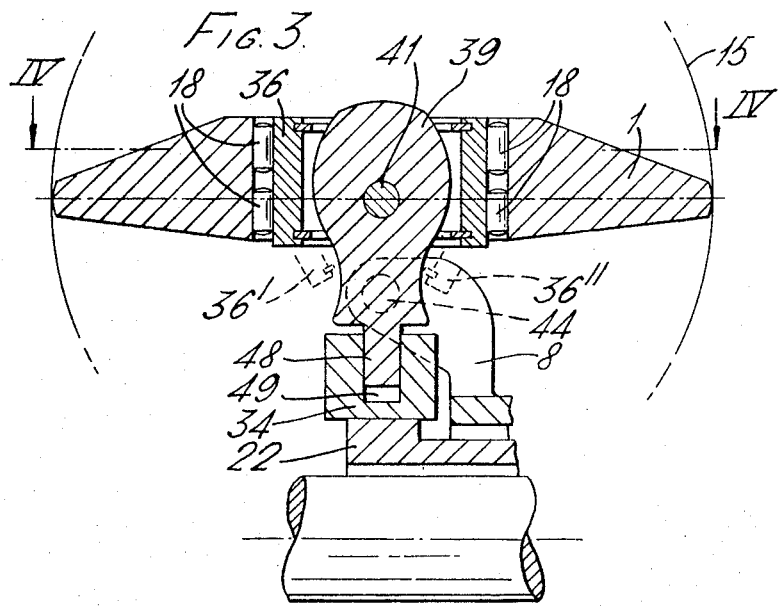
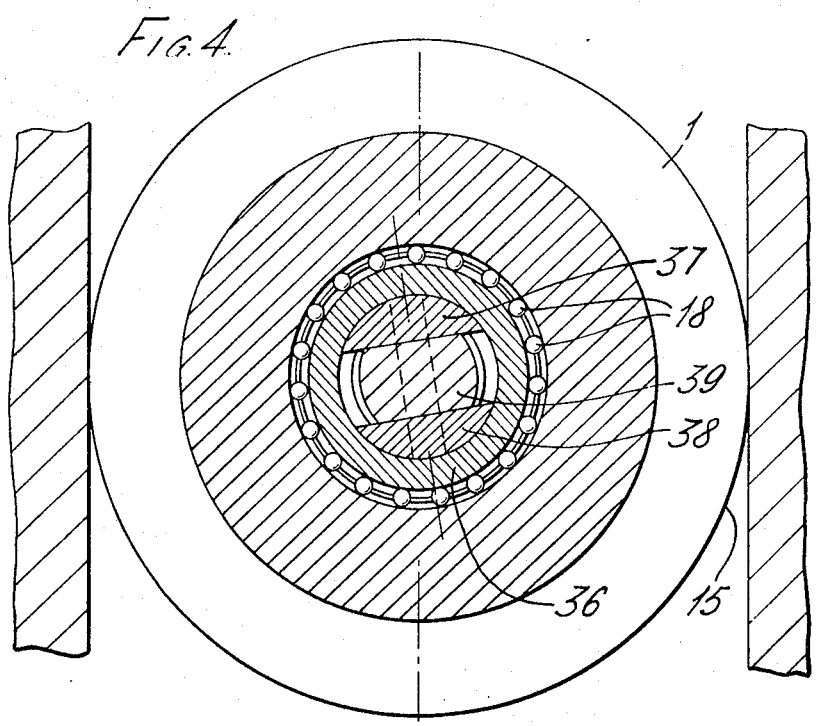

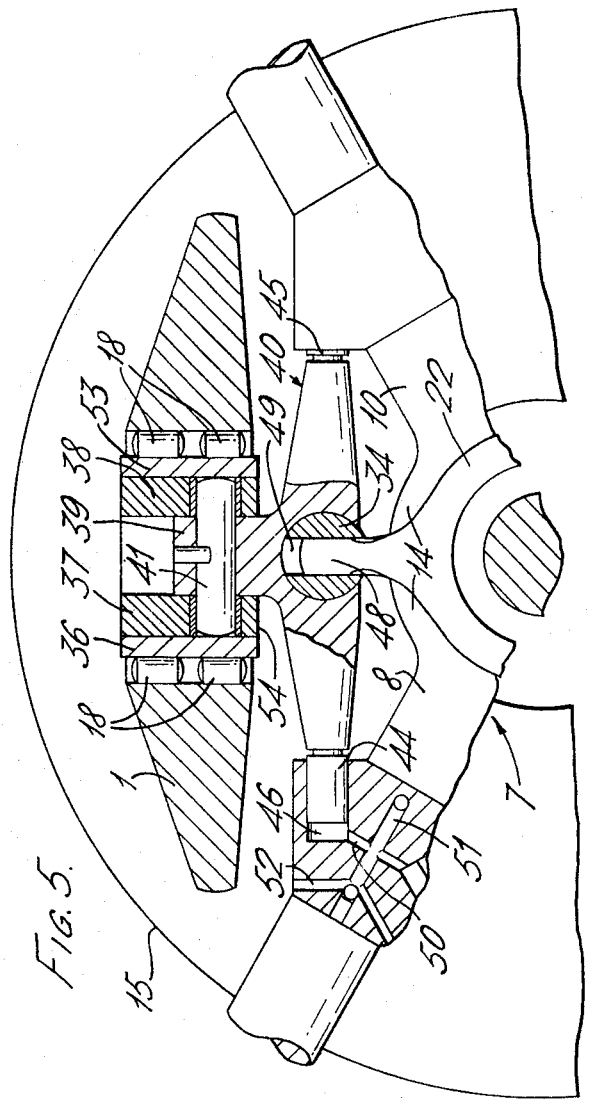

3,267,756
CONTINUOUSLY VARIABLE TRANSMISSION
Forbes George de Brie Perry, Felbridge, East Grinstead, and Thomas George Fellows, London, England, assignors to National Research Development Corporation, London, England, a corporation of Great Britain
Filed May 1, 1964, Ser. No. 364,894
Claims priority, application Great Britain, May 7, 1963, 18,089/63
10 Claims. (Cl. 74—200)

This invention relates to transmission units of the so-called "toroidal race rolling friction" type wherein rollers provide a driving connection between facing toroidal surfaces of an input disc and an output disc the rollers being mounted for rotation about axes which extend in a generally radial direction from, and normally intersect, the rotational axis common to the input and output discs (hereinafter called the "main axis"). Such a transmission unit is described in co-pending Serial application No. 110,572, now Patent No. 3,153,938.

According to the invention there is provided a transmission unit of the type wherein rollers provide a driving connection between facing toroidal surfaces of an input disc and an output disc journalled for rotation about a common main axis, each of the rollers being mounted for rotation about an axis which extends in a generally radial direction from, and normally intersects, the main axis, a mounting for each roller comprising a journal defining the said rotational axis and a swivel bearing around which the journal can vary its inclination about a ratio change axis which is normal to the roller rotational axis and which lies in a plane inclined to the plane containing the main axis and the roller centre by an angle differing from 90° by a camber angle which may be zero, the roller centre being defined as a point on the roller rotational axis and between two planes each of which contains an outer edge of the running track on the roller which makes driving contact with the discs, the roller mounting further comprising means for restraining rotation of the roller about an axis passing through its points of contact with the discs, means for guiding the roller for bodily motion in a direction normal to its rotational axis in a mode such that the rotational axis may be moved from a position in which it lies in a plane containing the main axis and the roller centre to a position in which it lies in a plane parallel to the former plane but displaced from the main axis characterised in that the rollers are individually coupled to different spaced apart thrust receiving points on a common thrust receiving member by means of elements which act internally upon the inner surfaces of the journals of the rollers respectively but are themselves anchored against participation in inclination motions of the rollers about their ratio change axes and characterised in that the said restraining means for each roller comprises at least one guide member anchored to fixed parts of the transmission unit and at least one slide member cooperating with the guide member to provide a slide assembly whereby the slide member is guided for sliding in a direction normal to the main axis.

In a transmission unit of the type described changes of ratio are obtained by changing the angle (hereinafter called the "ratio angle") between the rotational axis of each roller and the main axis. It is impracticable to change the ratio angles of the rollers by direct action because the forces required are too great and it is known to effect changes of ratio angle by causing the rollers to steer themselves along helical paths along the toroidal surfaces of the discs until a desired ratio angle is attained. The condition necessary for a roller to steer itself to a different ratio angle in this way is that the roller rotational axis should cease to intersect the main axis. This may be brought about by tilting the roller about an axis passing through the points of contact between the roller and the two discs (this is hereinafter called "direct tilt angle rotation"). Alternatively it may be brought about by bodily translation of the roller from a position in which its rotational axis lies in a first plane which also contains the main axis, to a position in which the rotational axis of the roller lies in a second plane parallel to the first plane; this is hereinafter called "tangential shift" of a roller because the roller is translated laterally of the main axis substantially in the direction of the tangent, at the roller centre, to the circle which is the locus of the centre of the circle which forms the generator of the torus of which the toroidal surfaces of the two discs form parts. This locus circle is hereinafter called the "torus centre circle." In some known transmission units changes of ratio angle are initiated by a combination of direct tilt angle rotation and tangential shift of rollers.

Unless all the components of the transmission unit are to be made to extremely high limits of accuracy it is necessary to incorporate some system whereby the rollers automatically adjust themselves to ratio angles at which they share equally in the driving action. To achieve this it is necessary that some part of the roller support should be capable of motion in the line of action of the torque reaction forces to which a roller is subjected, i.e. in the direction of the tangent at the roller centre to the torus centre circle. There must be an element of tangential shift in the ratio control system, for the rollers to respond in this way.

As the effective rolling track around the periphery of a roller is of finite width and thus engages the disc at different diameters, the roller is subjected to skewing forces tending to rotate it in the direct tilt angle rotation sense. When a roller axis is normal to the main axis (the transmission ratio being then 1:1), the skewing forces at opposite sides of a roller are equal and opposite but when a roller axis is inclined to the said common axis (the transmission ratio then being other than 1:1), the skewing forces do not balance one another and the roller is subjected to a skewing couple. If the roller were able to undergo direct tilt angle rotation, this skewing couple would be in the sense to initiate a ratio change by the roller in the direction of 1:1 ratio.

To ensure equal distribution of driving action between the rollers they are preferably supported in such a way that the torque reaction thrusts to which they are subjected are individually referred to spaced-apart thrust receiving points on a common thrust receiving member which is free to move in a mode permitting the rollers to assume different attitudes so that each roller tends to steer itself to a ratio angle such that it bears a torque reaction thrust equal to that borne by each of the other rollers.

If the roller support means provides for ratio control and load equalisation by a combination of tangential shift and direct tilt angle rotation then the skewing couples to which the rollers are subjected, are referred to the common thrust receiving member and are superimposed on the torque reaction forces. Any inequality in these skewing couples as between one roller and another, leads to faulty equalisation of the torque reaction thrusts.

It might be considered desirable to equalise both sources of error simultaneously but this is not so because the losses arising at a roller due to skewing forces cannot be cancelled in this way as they exist even when the skewing forces are in balance in the 1:1 ratio position and are not substantially dependent on skewing couple. If unequal skewing couples as between the rollers of a set are superimposed on unequal torque reaction loads the latter will not be completely equalised when equilibrium is reached. A roller with a higher skewing couple than that of the other rollers, will be in a ratio nearer to 1:1 than it should be for perfect torque load sharing, with no compensating advantage since the skewing losses at that roller are not reduced.

In the complete specification accompanying the said co-pending serial application No. 110,572 there are disclosed transmission units of the type described in which each roller is provided with a roller carrier which extends laterally of the main axis to a point at which it is connected to an end of a rocker lever by a pivot coupling lying on the axis about which ratio angle changes of the roller take place. This axis passes through the roller centre and is herein called the "ratio angle axis." The rocker lever is fulcrumed on a pin carried by a spider secured to the transmission unit casing and its other end engages a thrust receiving point on the common thrust receiving member.

It has been found that the roller is the limiting component of transmission units of the type described, from the point of view of fatigue life and that, for a given stress level, the larger the diameter of the roller the larger the torque that can be transmitted. At the same time it is desirable to keep down the diameter of the discs as far as possible so as to keep down the overall bulk of the transmission unit.

It is advantageous to make the diameters of the rollers as large as possible in relation to the diameter of the torus centre circle for another reason namely that it enables a given overall ratio range to be attained with a smaller range of ratio angles for the rollers. This is desirable in that it reduces the stress levels, for a given duty required of the transmission unit in the extreme ratio. Large ratio angles lead to high stress levels because the side of a roller contacting a disc at a small diameter is rolling upon a highly convex surface when the ratio angle is large whereas, when the ratio angle is small the roller is rolling upon a surface which approximates more nearly to a flat surface. Furthermore, at high ratio angles there is a "cosine effect" multiplication of the compressive "end loading" applied to the discs along the direction of the main axis to keep the discs and rollers in driving engagement. Numerous methods of applying this end loading, in dependence on the torque transmitted by the transmission unit, have been proposed and some of such methods can profitably exploit this cosine effect at one end of the ratio range but at the other end of the ratio range the cosine effect causes excessive compressive stresses at the roller and disc contact zones.

It might be thought that the range of ratio angles could equally well be reduced by increasing the roller diameter without restricting the diameter of the torus centre circle since the diameter of the torus generator circle (which determines the curvature of the disc faces) is equal to the roller diameter. This is not the case however because a certain ratio angle of a roller of a certain diameter determines the difference between the two disc diameters engaged by the two sides of the roller and to maximise the ratio range this difference must be as large a proportion as possible of those two disc diameters.

For any given diameter of the torus centre circle if the diameter of the rollers is progressively increased, a point is reached at which it is difficult to accommodate the somewhat bulky load-bearing pivot connections between the roller carriers and the rocker levers without occupying space extending beyond the bounds of the cylindrical enclosure which would contain the discs with a satisfactory working clearance. This involves an increase in the overall size of the transmission unit and is to be deprecated.

In two forms of the invention to be described, roller carriers extending beyond the margins of the rollers are retained but only light trunnion bearings need be accommodated on the ratio angle axis, the torque reaction thrust of the rollers being referred directly to the common thrust receiving member without the intervention of rocker levers.

In a third form of the invention to be described, roller carriers extending beyond the margins of the rollers, are dispensed with.

The invention will be more readily understood from the following description of certain embodiments thereof illustrated in the accompanying drawings in which:

FIGURE 1 is a cross sectional elevation of a first embodiment of the invention;

FIGURE 2 is a cross-sectional elevation of a second embodiment of the invention;

FIGURES 3 and 4 are sections in different planes through a roller and its mounting as used in the said second embodiment of the invention; and FIGURE 5 is a part cross-sectional elevation of a variant of the said second embodiment of the invention.

In the cross-sectional elevations of FIGURES 1, 2 and 5 the driving disc is removed to reveal the rollers and their mountings and for the purposes of the description the driving disc is assumed to rotate clockwise.

In FIGURE 1 there are three rollers 1, 2 and 3, carried by bridge-like roller carriers 4, 5 and 6. A spider 7, anchored to the casing (not shown) of the transmission unit, has three arms 8, 9, and 10 which extend radially inwards from their respective anchorages 11, 12 and 13, by which they are anchored to the said casing, to a central hub 14 which may form a support for the rotational bearing of the driven disc the outline of which is indicated by the circle 15.

Roller 1 and its mountings are sectioned. The roller carrier 4 supports a hub member 16 about which roller 1 rotates. This hub member 16 is secured by means of a spigot 17 which may be shrunk into or otherwise secured to the roller carrier 4. The outer surface of hub member 16 forms the inner race of a needle roller bearing having needle rollers 18, the outer race of the bearing being formed by the bore in the roller 1 itself. The hub member 16 is bored out to receive a part spherical socket 19 in which is contained a ball 20. There is a cylindrical bore in ball 20, running from pole to pole, which receives a cylindrical spigot 21 extending radially outward from a central common thrust receiving member 22. Spigot 21 constitutes the thrust receiving point to which torque reaction loads, arising at roller 1, are referred.

Socket 19 is secured within the bore of hub member 16 by means of a spring clip 23.

Roller carrier 4 extends beyond the margins of the roller, in directions transverse of the main axis of the transmission unit. The ends of the roller carrier overlap the running track of the roller and have outwardly facing spigots 24 and 25 which are coaxial with the ratio angle axis of the roller and which are accommodated in sockets 26 and 27 in arms 8 and 10 respectively, of the spider 7.

The ratio angle axes of the rollers may be in the plane of the torus centre circle, in which case provisions must be made in the ratio control system external to the variable ratio unit itself, to return the rollers to central equilibrium positions after a displacement along their ratio angle axes, when a required ratio angle change has been completed. Such a displacement is initiated by rotation of common thrust receiving member 22 and the displacement causes the rotational axes of the rollers to depart from their equilibrium orientations where they intersect the main axis, whereupon the rollers steer themselves into different ratio angles. When the ratio angle axes of the rollers are in the plane of hte torus centre circle, this steering action persists until the common thrust receiving member is restored to its original position.

In control systems for variable ratio transmission units of the type described it is known to control the ratio by means of a servo system dependent on some measurable parameter of the system, e.g. the input speed, the output speed, or the ratio itself. With such a system it can be arranged that the rollers are restored to their central equilibrium positions after an initial displacement, when the ratio has changed to a required extent.

Alternatively the ratio angle axes of the rollers may be inclined to the plane of the torus centre circle by an angle hereinafter called a "camber angle." In this case when the rollers are displaced in the tangential shift sense, to initiate a ratio change the resulting change of ratio angle will of itself bring the roller rotational axes into orientations at which they intersect the main axis and equilibrium is attained with the rollers still retaining the tangential shift displacement. The same type of servo system as that described above in relation to roller mountings without camber angle, will in principle work equally well when there is camber angle. The only difference is that equilibrium is attained at a number of different positions of the control member of the servo system, corresponding to different ratios, instead of always coming back to the same place.

On the other hand the provision of a camber angle lends itself more readily to a simple lever operated ratio control system in which different positions of the lever correspond to different ratios. The lever may be coupled through suitable linkages to the common thrust receiving member 22. The embodiments of the invention described herein are all capable of being used with or without a camber angle.

Common thrust receiving member 22 is free to float in any direction radially of the main axis so as to equalise the driving loads on the three rollers. For instance, if roller 1 is carrying more than its fair share of the load, roller carrier 4 will move to the right (this being the direction of the torque reaction with the conventions described above in connection with rotational direction etc.), and this motion will be transmitted via socket 19, ball 20 and spigot 21 to common thrust receiving member 22 which, being restrained from rotation around the main axis, will also move bodily to the right. The spigots corresponding to spigot 21, which co-operate with rollers 2 and 3, will move in the directions indicated by arrows 28 and 29 and rollers 2 and 3 will undergo tangential shifts in the opposite direction from that undergone by roller 1. The tangential shifts applied to rollers 2 and 3 will be equal to one another in magnitude and half (i.e. sin 30°) of the magnitude of the tangential shift undergone by roller 1. The result of these tangential shifts of the rollers is for roller 1 to change to a lower ratio where its share of the load will be reduced, whilst rollers 2 and 3 will change to higher ratios where their shares of the load will be increased. It is assumed that the loads on rollers 2 and 3 are equal to one another. If they are not, the movement of the common thrust receiving member will not be along the direction of the ratio angle axis of roller 1 but will be inclined thereto. Whatever unequal torque reaction forces are applied to the three torque receiving points of the common thrust receiving member 22 it will move bodily in a radial direction the inclination of which will be the direction of the resultant of the three forces, and the magnitude and direction of the consequential tangential shifts of the three rollers will be proportional in magnitude and corresponding in sign to the differences, in the torque loads they are individually bearing, from the mean of the three loads.

When a camber angle is provided the common thrust receiving member will remain in a radially displaced attitude when the rollers have completed a load-equalising operation.

When there is no camber angle the same initial radial displacement of the common thrust receiving member takes place in response to an inequality between the loads at the rollers but, as an overloaded roller steers itself to a lower ratio angle it relieves itself of the excessive load in the process whilst the underloaded rollers assume increasing loads in the course of steering to higher ratios. During this changing of the loads at the rollers the forces applied to the thrust receiving points on the common thrust receiving member are approaching equality. As this equality cannot be sustained unless the roller axes all intersect the main axis the common thrust receiving member must ultimately settle down in a central position.

This central position is not necessarily the same in all ratios of the transmission nor at all times during the life of the transmission, because manufacturing inaccuracies or wear may lead to differences in the relationship between the rotational axis of a roller and the position of its associated thrust receiving point.

If the common thrust receiving member remained radially displaced for too long after the rollers had started to steer to new ratio angles they would continue to steer indefinitely but would pass through an instant of load equality whereafter the hitherto overloaded roller would become more lightly loaded than the others. This would cause the common thrust receiving member to assume a different radially displaced attitude tending to steer the rollers back along the course they had previously embarked upon. It might be thought that the equilisation action would be subject to severe hunting. Actually however the disparity in the torque loads which caused the initial displacement of the common thrust receiving member is reduced in progressively decreasing increments as equalisation is approached, the common thrust receiving member moving back towards the central position at a progressively diminishing velocity. It is therefore not inherently likely to overshoot, and indeed is more likely to undershoot, the true central position.

Where a camber angle is used, the sockets 26 and 27 will have their axes individually parallel to the plane of the torus centre circle but they will be laterally displaced from that plane along the direction of the main axis. To enable the roller carrier to rotate about the camber-angled ratio change axis and yet move bodily in a direction parallel to the plane of the torus centre circle, the spigot ends 24 and 25, of the roller carrier must be of spherical form where they engage sockets 26 and 27.

The arrangement shown in FIGURE 1, though eliminating the need for load-bearing swivel joints beyond the margins of the rollers along the lines of their ratio angle axes, does nevertheless occupy some space in these places because of the need to accommodate trunnions such as 24, 25, 26 and 27. If the diameters of the rollers are to be still further increased in relation to those of the discs, it becomes necessary to avoid the locating of any of the rollers support means in these places.

FIGURES 2, 3, 4 and 5 show arrangements of this type in which the roller diameter is equal to the diameter of the torus centre circle.

It is clear from an inspection of FIGURE 4 that trunnions such as 24, 26 supporting a roller carrier such as 4, in FIGURE 1, would extend beyond the outer circumference of disc 15 which would involve an enlargement of the casing to accommodate them. This is particularly disadvantageous in a transmission unit having two sets of facing toroidal surfaces and two sets of rollers and which is required to have coaxial input and output shafts because, in such a case, a drum enclosing one set of rollers is required to connect the central disc to the input shaft or the output shaft as the case may be and the diameter of this drum must be large enough to clear the enclosed set of rollers and their supporting structure.

In FIGURE 2, in which the same reference numerals as those used in FIGURE 1 are used to denote corresponding items, the rollers have larger central apertures than in the case of FIGURE 1 and their immediate support means are accommodated within these central bores. Roller 1 is sectioned from which it is seen that the needle rollers 18 ride upon a tubular inner race 36 within which are two inserts 37 and 38 which are in the form of segments of a cylinder having inner flat faces parallel to one another. Between these faces there is accommodated an upstanding branch 39, of a roller locating member 40. Branch 39 has two parallel flat faces which mate with the flat faces of segments 37 and 38 to determine the orientation of the ratio angle axis of the roller. This orientation action may be augmented by the provision of a pin 41 passing through a hole normal to the said flat faces on branch 39 and coaxial with the ratio angle axis of the roller. The outer ends of pin 41 enter holes in the segments 37 and 38. The pin is not essential for the determination of the ratio angle axis of the roller but it provides a convenient means for anchoring segments 37 and 38. It is desirable to have some means for preventing race 36 from revolving around the segments 36 and 37. This may be achieved by the provision of axial keys and keyways (not shown) in the facing surfaces of race 36 and segments 37 and 38.

The roller locating member 40 has two laterally extending branches 42 and 43 which terminate in coaxial cylindrical spigots 44 and 45 which are accommodated in sockets 46 and 47 in the ends of spider arms 8 and 10 respectively. The roller locating member 40 can rotate about the axis of stubs 44 and 45 to any extent necessary to allow for small variations of the location of the discs in relation to the spider 7 along the main axis, which may arise from inaccuracies of manufacture. Subject to this however, member 40 does not change its orientation after assembly of the transmission unit except to the extent to which the discs may be deformed on application of the end load force necessary to hold the disc and rollers in driving engagement. Such an end loading force is commonly applied by means of a camming device coaxial with the said common axis which produces an end loading force dependent on applied torque. This may cause a minute amount of movement of member 40 as between lightly loaded and heavy loaded conditions of the transmission unit.

A cylindrical stud 48 extends radially inward from the centre of member 40 and engages a transverse cylindrical bore 49 in a guide member 34 carried in a part cylindrical slot in the common thrust receiving member 22. The orientation of this slot may be slanted in relation to the main axis and the guide member 34 may slide axially in relation to the common thrust receiving member since it is anchored by the stub 48 in relation to member 40.

Rotation, or axial movement (when the guide member 34 is slanted), of common thrust receiving member 22 causes movement of member 40 along the common axis of spigots 44, 45 which in turn results in a tangential shift of the roller 1.

The orientation of the flat faces on branch 39 of member 40 may be parallel to the plane containing the main axis and the roller centre in which case there will be no camber angle. Alternatively these faces may be inclined to that plane to provide a camber angle. Preferably the axis common to stubs 44 and 45 lies substantially in the plane of the torus centre circle.

With this arrangement equalisation of the loads carried by the rollers is achieved in the same way as was previously described in relation to FIGURE 1.

FIGURE 3 shows a section of roller 1 and its mounting assembly in the plane containing the said common axis and the roller centre, and FIGURE 4 shows a section in a plane, indicated at IV—IV in FIGURE 3, normal to the rotational axis of roller 1. FIGURE 3 shows in dotted lines, the positions 36′ and 36″ which the lower edge of race 36 will occupy in the extreme ratio angle attitudes of roller 1. It will also be observed that the upper extremely of branch 39 is shaped so as to provide an end stop for the roller by bearing against the inner surface of race 36 when the roller is in either of the extreme ratio angle attitudes.

FIGURE 5 shows an alternative construction of an arrangement of the type shown in FIGURE 2. Only one roller is illustrated and the same reference numerals as these in FIGURE 2 are used to denote corresponding items.

The principal difference from the arrangement of FIGURE 2 is that the guide member 34 is housed in a part-cylindrical slot in the centre of member 40 and the pin 48 extends radially outward from the common thrust receiving member 22. This has the advantage of moving the thrust receiving point nearer to the roller centre and so reducing somewhat the bending stresses to which arms 42 and 43 are subjected as a result of the torque reaction forces from the roller. To ensure accurate location of the roller and avoid rotation of the roller in the direct tilt rotation sense, it is desirable that bending of the member 40 and its supports should be reduced to a minimum. Some slight yielding of these parts under load is inevitable of course and with the arrangements of FIGURES 2 and 5 any small direct tilt angle rotation of the roller due to this bending, would be in a sense such as to tend to initiate a ratio angle change towards a high ratio. This is an advantage in that it increases the virtual stiffness of the complete ratio control linkage including the means for applying ratio control movements to the common thrust receiving member 22. This may be illustrated by supposing that the said control means is moved to initiate a rise of ratio. This involves a rise in the torque reactions at the rollers which tends to bend the ratio control linkage as a whole and so to reduce the response of the rollers to the control movement. On the other hand the increased torque reaction also increases the bending of members 40 which results in a very small amount of direct tilt angle rotation of the rollers tending to steer them to a high ratio and this offsets the bending of other parts of the ratio controlling linkage.

It is nevertheless desirable to minimise bending of member 40 but insomuch as it cannot be avoided altogether it is important that it should be exploited to advantage. The difficulty does not arise in the case of FIGURE 1 since the thrust receiving point is coincident with the roller centre and there is thus no couple tending to rotate the roller in the direct tilt rotation sense.

Reverting to FIGURE 5; the sockets 46 and 47 in the spider arms 8 and 10 have closed ends and each communicates through a restrictive orifice 50 with an oil passage 51 supplied, through borings (not shown) in the spider, with oil from the lubrication pump with which transmission units of the type described are normally equipped. Another oil-way 52 communicates with passage 51 and directs a jet of oil transversely across the running tread at the periphery of the roller.

Oil trapped in the blind end of socket 46 can be expelled only via the clearance around spigot 44 and via the restrictive orifice 50. These escape paths are sufficient to permit the relatively slow axial excursions of spigot 44 which are associated with normal ratio control operations but the escape paths are small enough to apply substantial viscous damping to prevent oscillation of member 40. Spigot 45 and its support on spider arm 10 are not shown sectioned as they are similar to spigot 44 and its support on spider arm 8 which have been described.

Within the race 36 the segments 37 and 38 are integral with one another, being parts of a cylinder through which a parallel-sided slot is machined to receive branch 39 of member 40. The gudgeon pin 41 is stouter than that used in the FIGURE 4 arrangement and may be received in bushes in segments 37 and 38 which segments are staked at 53 and 54 into notches machined into the inner terminal edges of the race 36 to prevent rotation of race 36 and to locate the same on segments 37, 38. Less reliance is placed upon the mating surfaces of segments 37, 38 and the side faces of branch 36 for determining the orientation of the ratio angle axis of the rollers, this function being entrusted predominantly to the gudgeon pin 41.

Since the rollers locating members 40 are sited radially inward of the rollers they may be supported at their ends, on rocker links pivoted on pins extending from the spider arms. The ends of the branches 42, 43 may be jointed to the free ends of these links by means of pivot joints parallel to the main axis, the normal clearance in such pivots being sufficient to accommodate any slight rotation of member 40 around the axis of branches 42 and 43. The axes of the links should be normal to the longitudinal axis of the branches 42, 43 in a central position of member 40 so that the motion permitted to the roller may be as nearly a true tangential shift motion as possible.

As another alternative the link at one end of each of the members 40 could be part of a rocker lever having a limb extending radially inwards and engaging a thrust receiving point on the common thrust receiving member. With this arrangement the direct connections from the centres of the members 40 to the common thruts receiving member 22, would be omitted and the end of the said limb of the rocker lever could terminate in a cylindrical spigot engaging a guide member such as 34 as shown in FIGURE 4.

We claim:

1. A transmission unit of the type wherein rollers provide a driving connection between facing toroidal surfaces of an input disc and an output disc journalled for rotation about a common main axis, each of the rollers being mounted for rotation about an axis which extends in a generally radial direction from, and normally intersects, the main axis, a mounting for each roller comprising a journal defining the said rotational axis and a swivel bearing around which the journal can vary its inclination about a ratio change axis which is normal to the roller rotational axis and which lies in a plane inclined to the plane containing the main axis and the roller centre by an angle differing from 90° by a camber angle which may be zero, the roller centre being defined as a point on the roller rotational axis and between two planes each of which contains an outer edge of the running track on the roller which makes driving contact with the discs, the roller mounting further comprising means for restraining rotation of the roller about an axis passing through its points of contact with the discs, means for guiding the roller for bodily motion in a direction normal to its rotational axis in a mode such that the rotational axis may be moved from a position in which it lies in a plane containing the main axis and the roller centre to a position in which it lies in a plane parallel to the former plane but displaced from the main axis characterised in that the rollers are individually coupled to different spaced apart thrust receiving points on a common thrust receiving member by means of elements which act internally upon the inner surfaces of the journals of the rollers respectively but are themselves anchored against participation in inclination motions of the rollers about their ratio change axes and characterised in that the said restraining means for each roller comprises at least one guide member anchored to fixed parts of the transmission unit and at least one slide member co-operating with the guide member to provide a slide assembly whereby the slide member is guided for sliding in a direction normal to the main axis.

2. A transmission unit as claimed in claim 1 in which the slide member associated with a roller and the journal for that roller are rigidly connected together.

3. A transmission unit as claimed in claim 2 in which the guide member associated with a roller, as well as providing a slide for the slide member of the roller, also provides a pivot aligned with the ratio change axis about which the slide member may rotate to constitute the said swivel bearing.

4. A transmission unit as claimed in claim 3 in which the common thrust receiving member is disposed around the main axis and between the main axis and the inner faces of the rollers, and is provided with a radially extending arm for each roller, the outer end of the arm associated with each roller being received within the journal for that roller with a ball joint centred about the roller centre, the said ball joint constituting the thrust receiving point for that roller.

5. A transmission unit as claimed in claim 3 with means for restraining and controlling rotational motions of the common thrust receiving member about the main axis for supporting the torque reaction of the rollers and for initiating ratio changes whilst permitting limited motion of the common thrust receiving member in any direction radial of the main axis for load equalisation between the rollers and in which the said ball joints permit relative radial motion between the arms and the effective swivel centres of the ball joints, to accommodate any such radial motion of the common thrust receiving member.

6. A transmission unit as claimed in claim 1 in which the slide members are slidably supported by the guide members in locations offset from the ratio change axes of their associated rollers in the direction of the main axis and in which each slide member comprises a projection received within the journal of its associated roller and providing in co-operation with the journal a swivel bearing defining the ratio change axis for the roller and constituting the said means restraining rotation of the roller about an axis passing through its points of contact with the discs, the swivel bearing restraining relative motion between the roller journal and the slide member axially of the ratio change axis.

7. A transmission unit as claimed in claim 6 in which each slide member is coupled to a thrust receiving point on the common thrust receiving member by means of a projection from the slide member extending inwardly therefrom towards the main axis and received within a swivel socket in the common thrust receiving member.

8. A transmission unit as claimed in claim 6 in which each thrust receiving point on the common thrust receiving member is constituted by a projection from the latter, received within a swivel socket in one of the slide members.

9. A transmission unit as claimed in claim 6 in which each of the said swivel bearings comprises an axle pin carried by the projection from the slide member, aligned along the ratio change axis of the associated roller and having projecting ends received within bushes secured within the journal of the roller.

10. A transmission unit as claimed in claim 9 in which the journal for each roller has a hollow cylindrical bore and with cheek pieces secured within the bore and providing the bushes for the axle pin each cheek piece having a face normal to the axis of a bush and bearing against a parallel face of the projection of the slide member to restrain relative motion between the slide member and the roller journal in the direction of the ratio change axis.

No references cited.

FRANK SUSKO, *Primary Examiner.*

DAVID J. WILLIAMOWSKY, *Examiner.*

L. H. GERIN, *Assistant Examiner.*